(12) United States Patent
Mallet

(10) Patent No.: US 6,430,990 B1
(45) Date of Patent: Aug. 13, 2002

(54) PIPE TESTING APPARATUS

(75) Inventor: Ronald James Mallet, Kaplan, LA (US)

(73) Assignees: Ronald J. Mallet; Kenneth Ray Mallet, both of Kaplan; P. Warren Trahan, Lafayette; Fred B. Trahan, Jennings, all of LA (US)

( * ) Notice: Subject to any disclaimer, the term of this patent is extended or adjusted under 35 U.S.C. 154(b) by 0 days.

(21) Appl. No.: 09/709,861

(22) Filed: Nov. 10, 2000

(51) Int. Cl.⁷ ................................................ G01M 3/04
(52) U.S. Cl. .......................................... 73/49.5; 73/40.7
(58) Field of Search ............................. 73/152.41, 49.5, 73/49.1, 46, 40.5 R

(56) References Cited

U.S. PATENT DOCUMENTS

| | | | | |
|---|---|---|---|---|
| 2,280,785 A | * | 4/1942 | Boynton | 166/11 |
| 2,979,134 A | * | 4/1961 | Reed et al. | 166/187 |
| 3,787,226 A | * | 1/1974 | Iglehart et al. | 117/66 |
| 3,795,138 A | * | 3/1974 | Hasha | 73/46 |
| 4,081,990 A | * | 4/1978 | Chatagnier | 73/40.5 R |
| 4,196,619 A | * | 4/1980 | Collins | 73/155 |
| 4,353,249 A | * | 10/1982 | Lagus et al. | 73/155 |
| 4,392,376 A | * | 7/1983 | Lagus et al. | 73/155 |
| 4,468,952 A | * | 9/1984 | Rathburn | 73/40.5 R |
| 4,519,238 A | * | 5/1985 | Hailey | 73/40.5 R |
| 4,617,823 A | * | 10/1986 | Lazes | 73/46 |
| 4,733,554 A | * | 3/1988 | Lazes | 73/46 |
| 4,879,900 A | * | 11/1989 | Gilbert | 73/155 |
| 5,219,388 A | * | 6/1993 | Meletiou et al. | 73/155 |
| 5,269,180 A | * | 12/1993 | Dave et al. | 73/152 |
| 5,563,336 A | * | 10/1996 | Mallet | 73/49.1 |
| 5,803,186 A | * | 9/1998 | Berger et al. | 175/50 |
| 5,925,879 A | * | 7/1999 | Hay | 250/227.14 |
| 6,026,675 A | * | 2/2000 | Jansch | 73/49.5 |

* cited by examiner

*Primary Examiner*—Hezron Williams
*Assistant Examiner*—Charles D. Garber
(74) *Attorney, Agent, or Firm*—William W. Stagg

(57) ABSTRACT

An apparatus for forming a test chamber within a tubular and internally pressure testing the tubular with a test gas. The apparatus is comprised of a generally cylindrical tester body having first and second spaced-apart sealing assemblies that are expandable against the inner wall of the tubular by a piston assembly so as to form a test chamber defined by the inner wall of the tubular and the expanded seal assemblies. The pistons of the first sealing assembly are gas actuated pistons acting in cooperation with the seals of the first sealing assembly in response to a gas under pressure. The pistons of the second sealing assembly are fluid actuated pistons acting in cooperation with the seals of the second sealing assembly in response to a fluid under pressure. The pressure of the gas and the pressure of the fluid used to actuate the first and second pistons are controlled independently of each other. The gas used to activate the first set of pistons is directed to the test chamber to serve as a test gas. The apparatus includes a sleeve container for retaining gas escaping from the test chamber to the exterior of the tubular. The sleeve container is provided with a gas detector for detecting the presence of test gas in the sleeve and a signal transmitter for generating signals indicating the presence of absence of test gas in the sleeve container. The preferred pressurized gas is helium and the preferred pressurized fluid is water.

31 Claims, 5 Drawing Sheets

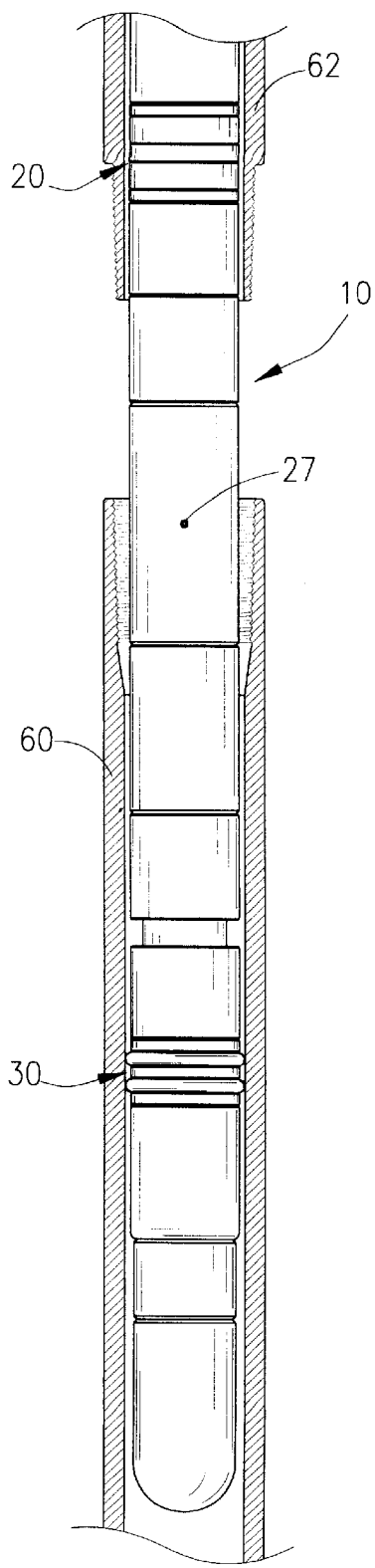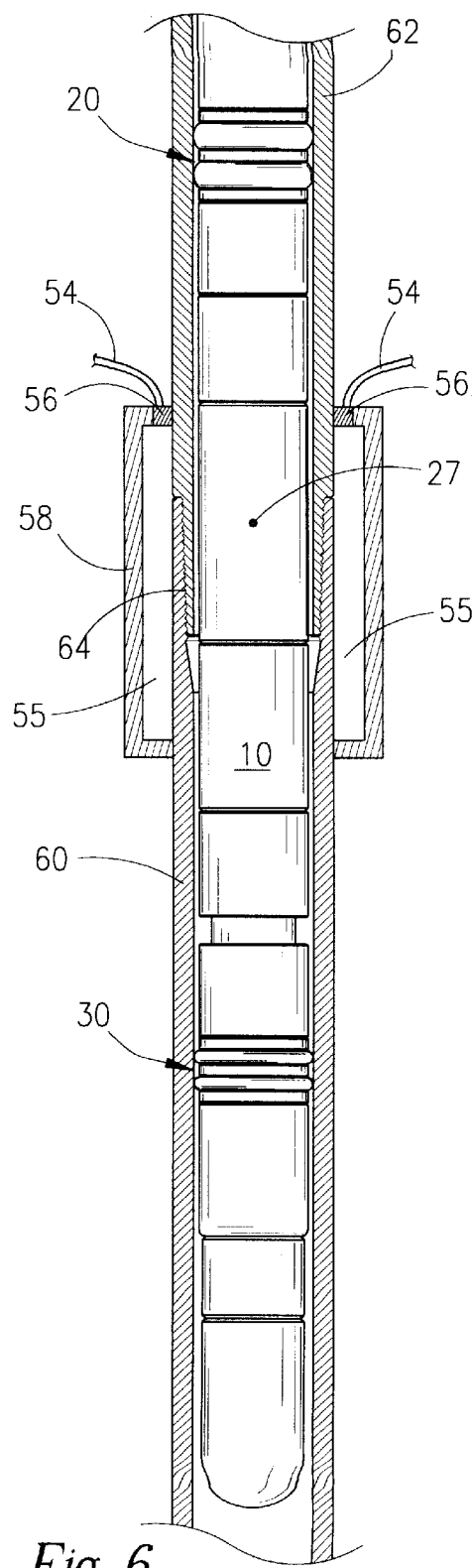
Fig. 5
Fig. 6

PIPE TESTING APPARATUS

FIELD OF INVENTION

The present invention generally relates to the field of drilling oil and gas wells and, more particularly, relates to an apparatus for testing the integrity of pipe segments, especially the connections between joints of pipe.

BACKGROUND OF INVENTION

In the oil and gas industry, many sections or lengths of tubular pipe are commonly strung together to form pipe strings or tubing strings often measuring many of thousands of feet in length. These pipe strings are employed in oil and gas wells to convey oil and natural gas from their subsurface environments to the surface of the wells. Typically, the pipe string is inserted within a string of larger diameter pipe known as casing. The pipe casing is intended to support and seal the walls of the well bore hole.

Because the oil and gas in the pipe string is typically conveyed to the surface of the wells at high pressures, the pressure integrity of the pipe string must be maintained. Oil or gas escaping from the pipe string into the annulus between the casing and the pipe string due can create a dangerous situation that may create an explosion, loss of the well, or both, and cause the loss of the oil and gas, environmental pollution, and injures to the personnel at the well site.

Typically, the segments of pipe that make up the pipe strings are jointed together by treaded connections, each segment of pipe having a threaded male connection at one and a threaded female connection at its opposite end to join and seal adjacent pipe segments together. A potential point of leakage or threat to the pressure integrity of the pipe strings is at the connection point, i.e., the threaded connection, between the pipe segments that make making up the pipe strings. Consequently, measures must be taken to guard against sealing deficiencies, leaks and other imperfections that threaten the pressure integrity of the threaded connections making up the pipe strings.

The connections between the segments of pipe forming the pipe string are typically tested by sealing the bore of the pipe string at points above and below the threaded connections between the pipe segments and introducing a fluid, either fluid or gas, under pressure into the sealed bore check for leaks. Efforts have been made to provide pressure testing tools to facilitate testing of the pressure integrity of pipe strings. One such device is that described in U.S. Pat. No. 5,563,336 to Applicant. In that patent applicant describes a tubular apparatus inserted into the pipe string, across the area or joint to be tested. The apparatus has a gas sealing line used to supply sealing gas under pressure to move upper and lower pistons, essentially simultaneously, that expand resilient seals against the internal walls of the pipe string. In that manner a test chamber, defining the space between the resilient seals and the pipe string wall, is created for the subsequent introduction of a test gas to check for leaks. When the testing is completed, gas pressure in the sealing gas line is reduced causing the retraction of the upper and lower pistons, again essentially simultaneously, releasing the seals of the apparatus.

A problem associated with the aforementioned tools and testing methods is the risk of a "tool kick" or rapid displaced of the tool caused when the high pressure testing gas in the testing chamber is released downward into the pipe string. "Tool kick" is often caused when the seal produced by the testing tool's lower sealing piston is broken before the seal produced by the tools upper sealing piston, even if only momentarily. The rapid release of pressurized gas down the pipe string may displace the tool upwardly with tremendous force creating a risk of injury to the personnel performing the pressure test and damage to the testing assembly, all increasing the costs and risks of the pressure testing.

Another problem associated with the present testing tools and methods may arise during the testing of connections of long pipe strings running into the well bore. Drilling fluids or mud is typically used to contain the surfaces of the bore hole and the down hole gas pressure as the pipe string is run into the bore hole. The drilling mud or fluids often begin to flow upwards through the tubing as each pipe segment is lowered into the well bore. The drilling fluids can cause the testing tool to float above the fluid making the correct or desired placement of the tool difficult. Even if the tool is correctly placed, the drilling fluids may surround the tool and be contained within the test chamber. The drilling fluid may then restrict the flow of testing gas or block the leak path of the testing gas causing the connection to appear to be leak free. When the drilling fluid is removed from the pipe string during production, the undetected leak can cause problems with the well.

Consequently, a need exist for improvements in testing tools that will reduce the risk of "tool kicks" as well as the incidence of unreliable pressure tests caused by the presence of drilling fluids in the area of pipe string being tested.

SUMMARY OF INVENTION

The present invention provides a pressure testing apparatus and method designed to satisfy the aforementioned needs. The pressure testing apparatus of applicant's present invention is comprised of a generally cylindrical tool having upper and lower piston driven sealing means or packers for insertion into a pipe string. For testing purposes the tool will be placed in the pipe string so that the area to be tested, typically a threaded connection, will be positioned between the upper and lower packers. The packers are used to create a test chamber in the annulus between the tool and the inner wall of the pipe string defined by the upper and lower packers.

A novel feature of applicant's present invention is that the upper and lower packers can be set and released independent of each other. In the preferred embodiment the lower packer is set with a piston driven by fluid pressure created in a pressurized fluid line, water being the preferred pressurized fluid, and the upper packer is set with a piston driven by gas pressure created in a pressurized gas line comprised of the testing gas.

During a typical testing operation, as the pipe string is being assembled, two segments of pipe with threadably connecting ends, each of an average length of approximately thirty feet, are made up, one length above the other, on the rig floor by means of the rig's power tongs. The testing apparatus of applicant's present invention is then inserted into top end of the upper pipe segment, through the upper segment and into the lower pipe segment so as to place the lower packer of the testing apparatus at a point below the connecting end of the lower segment.

Once the lower packer is positioned, the connection between the upper and lower pipe segments is made up, i.e. the ends of the pipe are threaded together, at the desired torque by means of the rig tongs. The lower packer is set against the interior wall of the lower pipe segment below the connection point by means of its fluid pressure piston and the upper packer is set against the interior wall of the upper pipe segment by means of the piston actuated by the pressurized helium. Typically, the upper and lower packers are set at the same time. However, as well conditions dictate, it may be desirable to set the lower packer prior to setting the upper packer. When the upper and lower packers are set in the described manner, whether at the same time or sequentially, the annulus area between the upper and lower packers and the interior wall of the pipe string defines a test chamber. Once the test chamber is formed, pressurized helium gas, evacuated from the interior of the tool through a gas orifice, fills the test chamber space.

After the connection is made up, a helium containment sleeve is placed on the pipe string around the outside of the connection to be tested. Within the helium containment sleeves are helium sensors design to detect the presence of helium that may be trapped within the containment sleeve. The helium sensors have electrical leads that transmit signals from sensors to a control panel that decodes the signals to display the presence or absence of helium and register the results of each test.

When the helium containment sleeve is in place, the helium pressure is increased to a desired test pressure for a desired period of time. Helium migrating from the test chamber travels to the helium containment sleeve where it is retained. The helium sensors are designed to detect even trace amounts of helium gas within the containment sleeve.

The length of the tool and the distance between the upper and lower packers can be altered by the addition of "subs", i.e. threaded sections of tool sized pipe, to adapt the tool to test connection assemblies of different lengths. Changes in tool length will allow the tool to test connections of downhole tool assemblies that are often linked together on the pipe string. Consequently, it is an object of applicant's present invention to provide a pressure testing device with upper and lower packers that will allow the upper and lower packers to be set and released independent of each other.

It is another object of applicant's invention to provide a pressure testing device that will allow the tool to be extended in length as may be required.

It is still another object of applicant's invention to provide a pressure testing tool with upper and lower packers that will allow the lower packer to be set in the pipe string independent of the upper packer so as to allow evacuation of drilling mud from the pipe string in the area above the lower packer.

It is another object of applicant's invention to provide a pressure testing tool with upper and lower packers to allow the upper packer to be set and released while the lower packer remains set against the wall of the pipe string.

It is another object of applicant's invention to provide a pressure testing tools that will reduce the incidence of "tool kick" during use.

Other objects of the invention will be apparent from the drawings and description set forth herein.

BRIEF DESCRIPTION OF THE DRAWINGS

FIG. 5 is a cross-sectional view of the tool of applicant's invention being set in a pipe string.

FIG. 6 is a cross-sectional view of the tool of applicant's invention set in a pipe string with a helium containment sleeve in place.

DESCRIPTION OF PREFERRED EMBODIMENT

Figure 1:
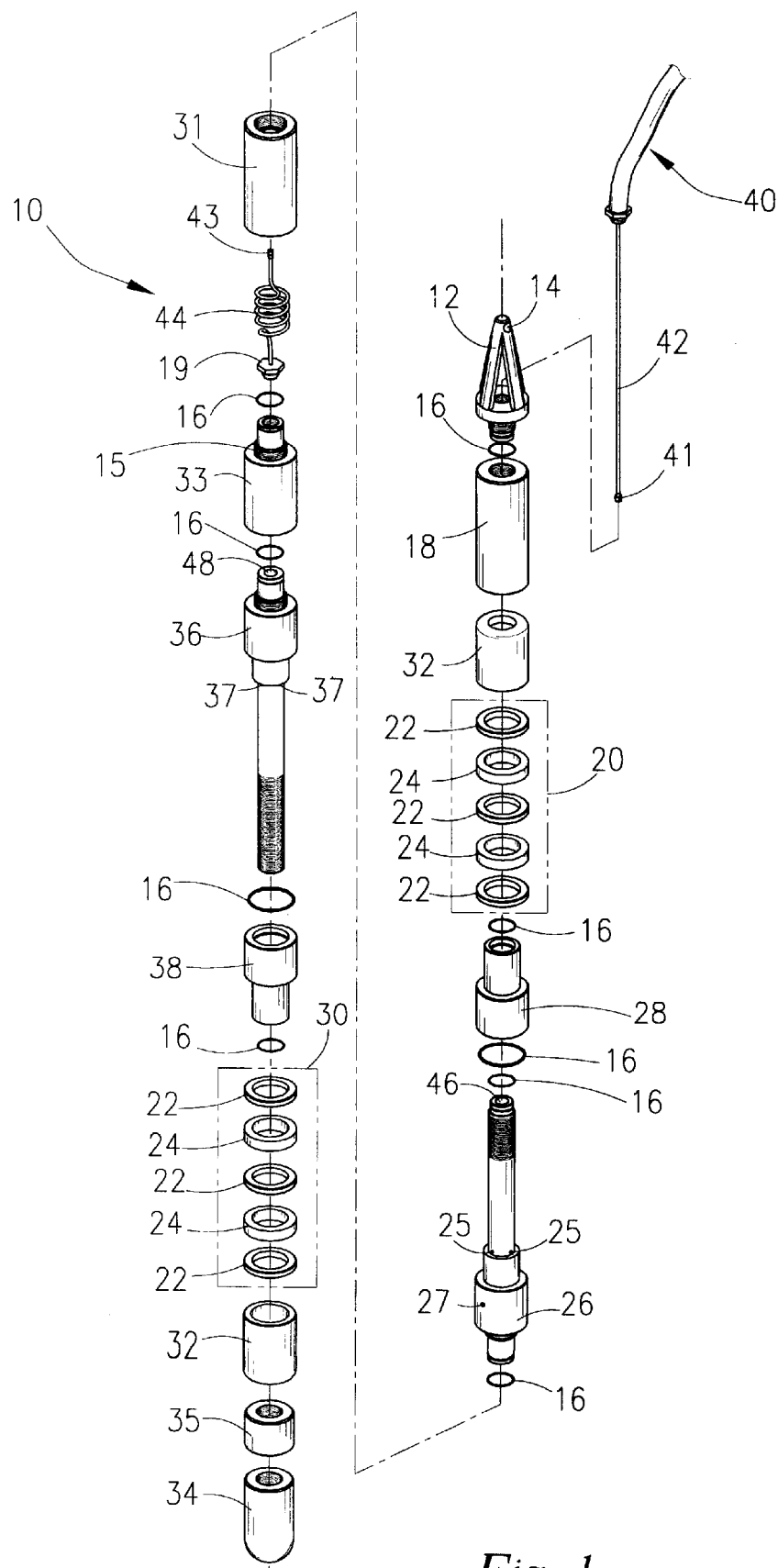
FIG. 1 is an exploded view of the tool of applicant's present invention.

Referring now to the drawings and more particularly to FIG. 1 there is shown an exploded view of the preferred embodiment of the generally cylindrical pressure testing tool (10) of applicant's present invention. The testing tool (10) is comprised on a series of generally cylindrical tubular sections fitted together by means of a plurality of threaded connections (15), male and female, each connection sealed by O-rings (16). The tool (10) has an upper packer seal assembly (20) and a lower packer seal assembly (30) spaced a desired distance apart for sealably holding the tool within a desired portion of a pipe string. The tool (10) has a lifting sub (12) having a lifting eye (14). The lifting sub (12) allows the tool (10) to be raised, lowered and positioned on the pipe string with a hoist, not shown, on a rig floor. Connected to the tool (10) is a gas hose assembly (40) through which runs a fluid line (42).

Figure 2:
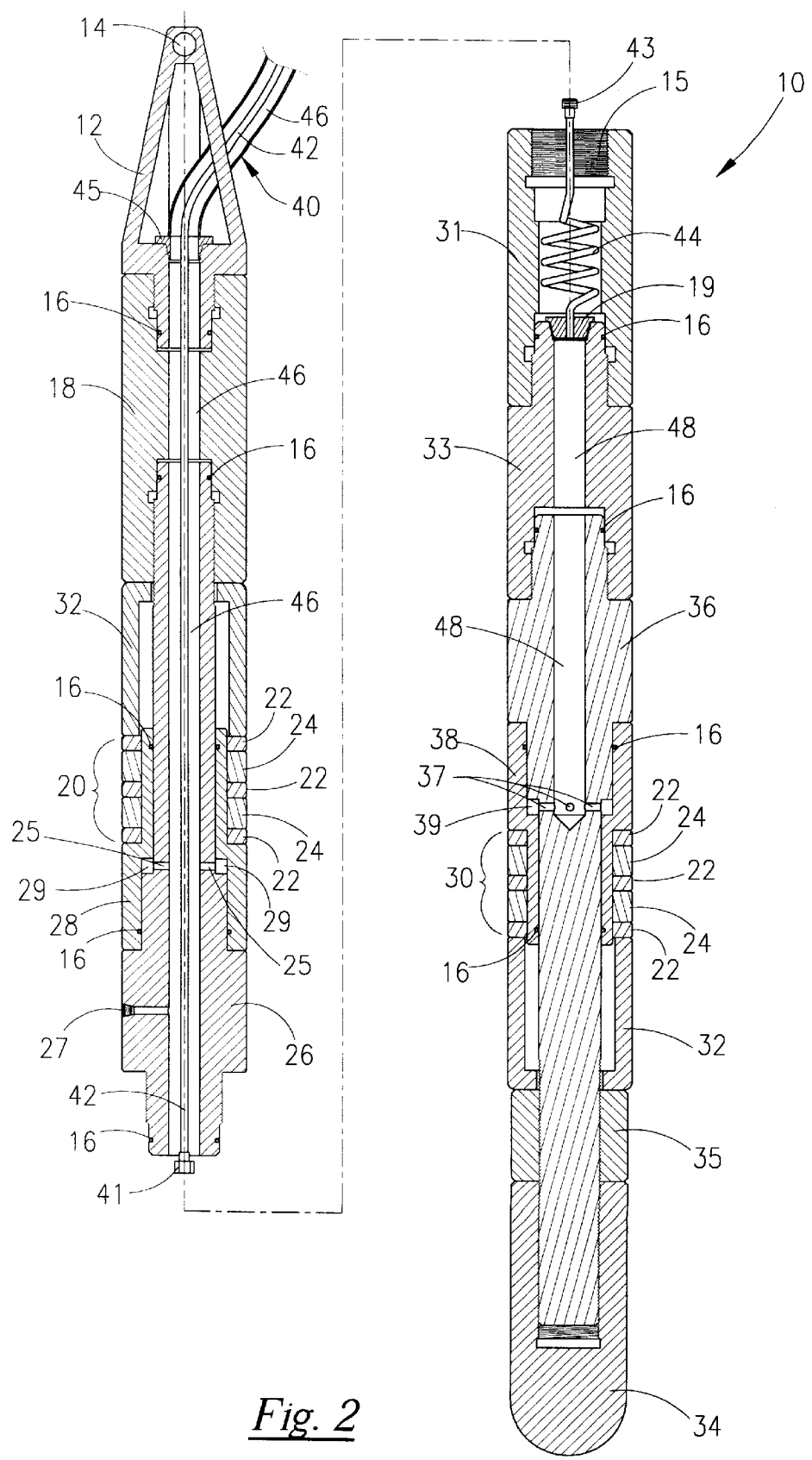
FIG. 2 is a cross-sectional view of the tool of applicant's invention.
Figure 3:
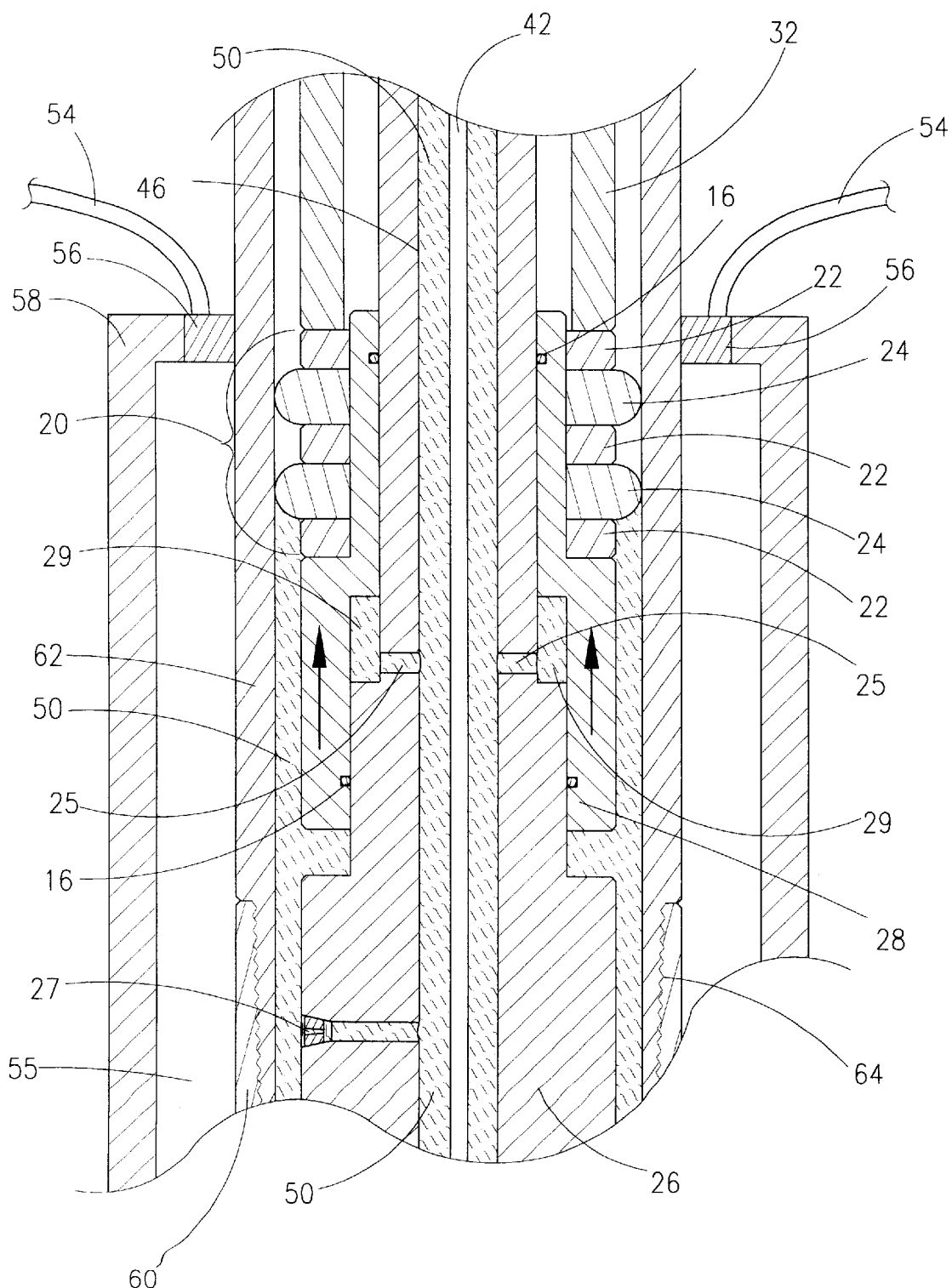
FIG. 3 is a cross-sectional view of the upper packer assembly of applicant's invention.

As shown in FIG. 2 and FIG. 3, the gas hose assembly (40) is connected to the gas passageway (46) of the lifting sub (12) by means of the gas hose fitting (45). A change-over sub (18), with its own gas passageway (46) in communication with the gas passageway (46) of the lifting sub (12), is connected to the lifting lug (12) by means of a threaded connection (15).

The upper packer core (26), shown connected to the change-over sub (18) by threaded connection (15), also has a gas passageway (46) in communication with the gas passageway (46) of the change-over sub (18). A stepped cylindrical tubular piston (28) is positioned around the upper packer core (26) to create a space or gas chamber (29). A cylindrical tubular piston stop (32) is positioned around the upper packer core (26) over the piston (28). O-ring seals (16) seal any gap between the inner walls of the piston (28) and the outside walls of the upper packer core (26).

The upper packer seal assembly (20), comprised of a plurality of spacer rings (22) and resilient sealing rings (24), is positioned around the piston (28). The gas chamber (29) is in communication with the gas passageway (46) of the upper packer core (26) by means of a plurality of gas piston orifices (25). A testing gas orifice (27), of substantially smaller diameter than the gas piston orifice (25), runs from the outside of the upper packer core (26) to the in gas passageway (46).

As shown in FIG. 2, the fluid line (42) runs through the gas passageway (46) through the base of the upper packer core (26) and through a threaded tubular adapter sub (31) that is connected to the base of the upper packer core (26). The opposite end of the threaded adapter sub (31) is connected to the top end of threaded tubular box pin sub (33). The box pin sub (33) has a fluid passageway (48) extending longitudinally through its center.

A gas plug (19), penetrated by fluid line (44) having fitting (43) at its top, seals the top end of the box pin sub (33) at fluid passageway (48) preventing gas penetration below the seal (19) into fluid passageway (48). The fluid line (44) is connected to fluid line (43) by means of fittings (41, 43). The bottom end of the box pin sub (33) is connected to the top of the lower packer core (36).

Figure 4:
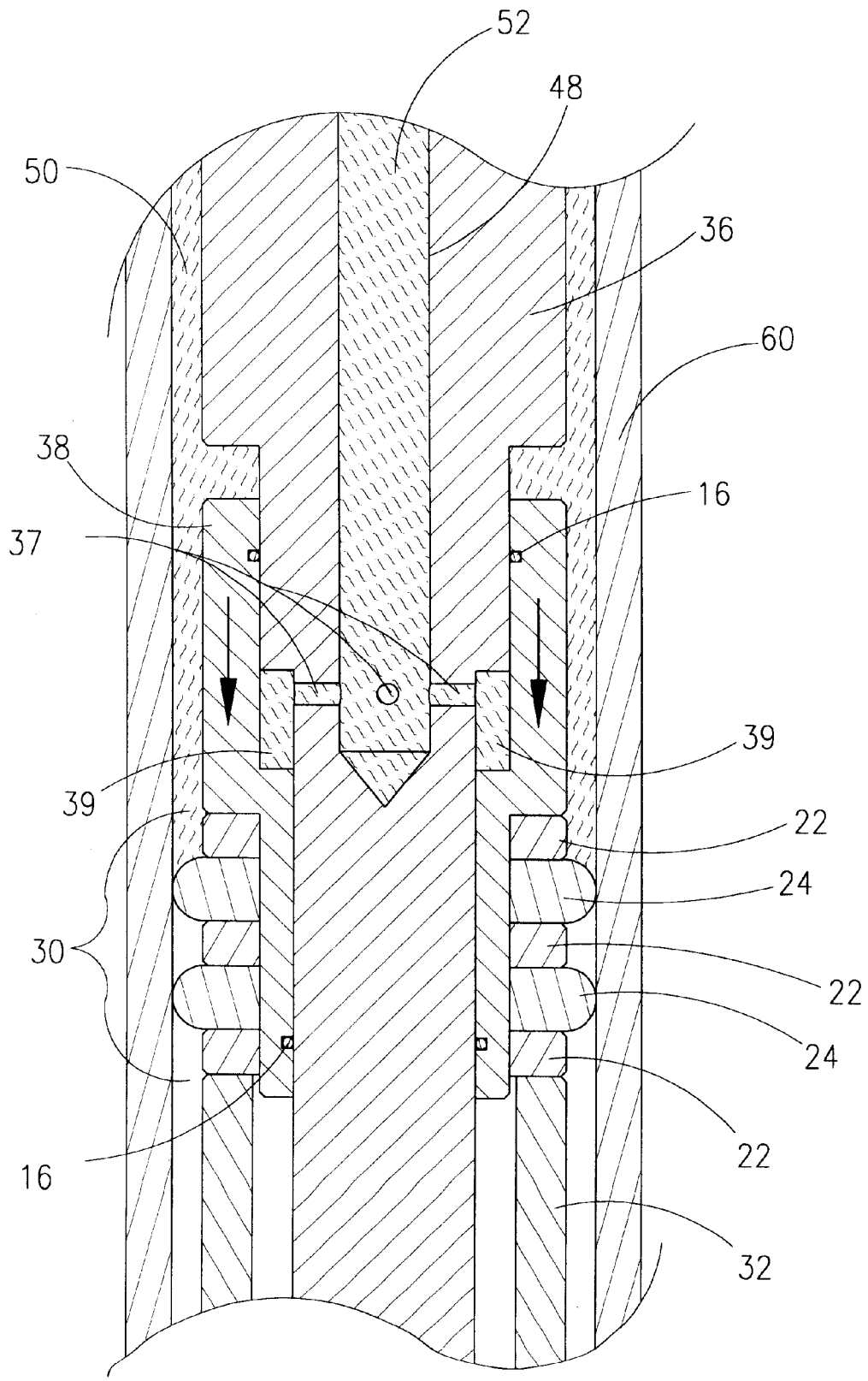
FIG. 4 is a cross-sectional view of the lower packer assembly of applicant's invention.

As shown in FIG. 2 and in FIG. 4, the lower packer core (36) has a fluid passageway (48) in communication with the fluid passageway (48) of the box pin sub (33). The fluid line (44) servers to deliver fluid through the gas plug (19) into the fluid passageway (48) of the box pin sub (33) and the fluid passageway (48) of the lower packer core (36). A stepped cylindrical tubular piston (38) is positioned around the lower packer core (36) to create a space or fluid chamber (39). A cylindrical tubular piston stop (32) is positioned around the lower packer core (36) over the piston (38). O-ring seals (16) seal any gap between the inner walls of the piston (38) and the outside walls of the lower packer core (36).

The lower packer seal assembly (30), comprised of a plurality of spacer rings (22) and resilient sealing rings (24), is positioned around the piston (38). The fluid chamber (39) is in communication with the fluid passageway (48) of the lower packer core (36) by means of a plurality of fluid piston orifices (37). A tubular jam nut (35) is threadably connected to the lower end of the lower packer core (38) and the lower packer core (38) is sealed at its end by threaded tubular plug (34).

As shown, FIG. 5 is a cross-sectional view of the tool (10) of applicant's invention being set in a pipe string As the pipe string is being assembled, segments of tubular pipe (60, 62) with threadably connecting ends, each of an average length of approximately thirty feet, are made up, one length above the other, on the rig floor by means of the rig's power tongs. As the string is assembled it is desirable to test the integrity of the threaded connections linking each pipe segment of the pipe string.

In testing each connection, the testing tool (10) is inserted through upper pipe segment (62) and into the lower pipe segment (60) of the pipe string so as to place the lower packer seal assembly (30) packer at a point below the upper connecting threaded end of the lower pipe segment (60) as shown. The threaded connection of the upper pipe segment (62) is then stabbed in the threaded connection of the lower pipe segment (60) and the connection is made up by the power tongs.

To begin setting the testing tool (10) in place to perform a pressure test, the lower packer seal assembly (30) is then set against the interior wall of the lower pipe segment (60) by means of fluid pressure piston (38). As shown in FIG. 2 and FIG. 4, the lower packer seal assembly (30) is actuated by a desired fluid pressure, preferably water pressure, exerted on fluid pressure piston (38) from fluid chamber (39), through fluid orifices (37), the fluid passageway (48) from fluid line (42) created by a pressurized fluid pump and fluid source (not shown). In the preferred embodiment the fluid line (42) is ⅛" in diameter though a larger or smaller line could be used. The pressure exerted at fluid chamber (39) moves the piston (38) expanding and holding the seals (24) of the packer assembly (30) against the inside wall of pipe segment (60). Tubular piston stop (32) stops the piston (38) from over expanding the seals (24) of the packer assembly (30) by restricting the outward movement of the piston (38).

The upper packer seal assembly (20) is then set against the interior wall of the upper pipe segment (62) by means of gas pressure piston (38). As shown in FIG. 2 and FIG. 3, the upper packer seal assembly (20) is actuated by a desired gas pressure exerted on gas pressure piston (28) from gas pressure chamber (29), through gas pressure piston orifices (25), the gas passageway (46), from gas passageway (46) in hose (40), created by a pressurized gas pump and gas source (not shown). The pressure exerted in gas pressure chamber (29) moves the gas piston (28) expanding and holding the seals (24) of the packer assembly (20) against the inside wall of pipe segment (62). Tubular piston stop (32) stops the piston (28) from over expanding the seals (24) of the packer assembly (20) by restricting the outward movement of the piston (38). When the upper and lower packers are set in the described manner, whether at the same time or sequentially, the annulus area between the upper packer assembly (20) and lower packer assembly (30) and the interior wall of the pipe string and connection between pipe segments (60, 62) defines the gas test chamber (50). After the gas test chamber (50) is created, gas under pressure flows into the test chamber (50) via a gas test orifice (27), of a substantially smaller cross-sectional area than the combined cross-sectional area of the gas pressure piston orifices (25). Gas pressure in the test space (50) is then raised to a desired pressure by the gas pump (not shown).

In the preferred embodiment the fluid line (42) is run through the hose (40). The annulus space in the hose (40), i.e., the space between the fluid line (42) and the inside of the hose (40), provides the hose gas passageway (46) for introduction of the testing gas to the tool (10). In the preferred embodiment helium gas from the pressurized gas source and pump is utilized to actuate the gas piston (28) and fill the gas test chamber (50) of tool (10) though other detectable gases could be utilized with the tool (10). The preferred fluid for use in the fluid line (42) to actuate the fluid piston (38) of the tool (10) is water.

Typically, the upper packer assembly (20) and the lower packer assembly (30) are set at the same time or within seconds of each other. However, as well conditions dictate, it may be desirable to set the lower packer assembly (30) prior to setting the upper packer assembly (20).

After the pipe string connection is made up and the packer assemblies of the tool are set in a desired location with helium gas pressure and water pressure as described and as shown in FIG. 6, a test gas containment sleeve (58) is placed on the pipe string around the outside of the connection to be tested. Within the test gas containment sleeve (58) is a plurality of test gas sensors (56), in the preferred embodiment helium sensors, having electrical leads (54) to a control panel (not shown). The test gas sensors (56) monitor the air within the containment sleeve (58) for the presence of test gas, in the preferred embodiment helium gas, that may have escaped the pressurized test space (50) through the pipe segment connection being tested. Signals from the test gas sensors (56) are transmitted via electrical leads (54) to the control panel to indicate the presence or absence of the test gas and register the results of the test. When the test is completed, the tool is released from its position within the pipe string by decreasing the gas pressure and the fluid pressure generated in the tool by the gas and fluid pumps. When the gas and fluid pressure is decreased the gas piston (28) and fluid piston (38) will move away from their respective seal assemblies, contracting the seal assemblies (20, 30). This will allow the tool to be hoisted away from the pipe string to be made ready for the next test. In this manner testing of sequential joints can be done in a rapid manner.

It should be understood that the length of the tool (10) and therefore, the distance between the upper and lower packer assemblies (20, 30) can be altered by the addition of various "subs", i.e. threaded sections of tool sized tubular pipe. Use of such subs allow the tool to be adapted for the testing of connections of various tool assemblies of different lengths. Changes in the length of tool (10) by the addition of subs will allow the tool to test connections between various tool assemblies that are often linked together on the pipe string.

It is also important to note that a feature of the tool (10) as described and disclosed herein is that the packer assemblies (20 and 30) can be set and released independent of each other. In the preferred embodiment of the tool (10) the lower packer assembly (30) is set with fluid piston (38) driven by the fluid pressure created in the fluid chamber (39) via fluid passageway (48) and the fluid pump (not shown). The upper packer assembly (20) is set with gas piston (28) driven by the gas pressure created in the gas pressure chamber (29) via gas passageway (46) driven by the gas pump (not shown). The two pumps (gas and fluid) are completely separate from each other and are controlled by independent valve systems. Releasing the lower packer assembly (30), after the upper packer assembly (20) will provide an important feature for the control of "tool kick" during the testing operation. Further, setting the lower packer assembly (30) prior to and independent of the upper packer assembly (20) will allow, if desired, drilling fluids present above the lower packer assembly (20) to be evacuated from the portion of the pipe string above the lower packer assembly to facilitate testing accuracy. Drilling fluids, due to their physical properties, have been known to mask leaks in pipe strings connections tested under methods used heretofore.

Further, it should be noted that the aforesaid description is adapted to refer to the testing of essentially vertical pipe strings such as those employed in the drilling and production of oil and natural gas wells. It should be apparent the tool of applicant's invention could also be employed in essentially horizontal pipe strings such as those that might be employed in production pipelines. The tool and methods described could also be employed in the pressure testing of welded or other types of tubular connections.

Finally, It is thought that the pipe testing apparatus and method of the present invention and many of its attendant advantages will be understood from the foregoing description. It is also thought, and it will be apparent, that various changes may be make in the form, construction and arrangement of the parts thereof without departing

I claim:

1. An apparatus for forming a test chamber within tubulars and internally pressure testing said tubulars with a test gas comprising:
    (a) a generally cylindrical tester body having first and second spaced-apart sealing assemblies said sealing assemblies each having a plurality of resilient seals, said seals of said seal assemblies being sealably expandable against the inner wall of said tubular;
    (b) means for expanding said seals of said first and second seal assemblies against the inner wall of said tubular independent from each other so as to form a test chamber defined by the inner wall of said tubular and said expanded seal assemblies;
    (c) means for supplying a pressurized test gas to said test chamber;
    (d) retaining means for retaining test gas that has escaped from said test chamber to the exterior of said tubular; and
    (e) means for detecting the presence of test gas in said retaining means.

2. The apparatus of claim 1, wherein said means for expanding said seals of said first and second sealing assemblies against the inner wall of said tubular independent from each other comprises, a first piston assembly, said first piston assembly having a plurality of first pistons, said first pistons moving axially from said tester body in response to pressurized gas so as to seal said plurality of resilient seals of said first sealing assembly against the inner wall of said tubular when said gas pressure is applied and a second piston assembly, said second piston assembly having a plurality of second pistons moving axially from said tester body in response to pressurized fluid so as to seal said plurality of resilient seals of said second sealing assembly against the inner wall of said tubular when said fluid pressure is applied.

3. The apparatus of claim 2, wherein said pressurized gas for moving said first pistons is said test gas.

4. The apparatus of claim 3, wherein said retaining means for retaining test gas that has escaped from said test chamber to the exterior of said tubular is a tubular containment sleeve wrapped around the outside of said tubular.

5. The apparatus of claim 4, wherein said test gas supply means comprises a conduit running centrally through said tester body for moving said first piston assembly and for supplying said test gas to said test chamber.

6. The apparatus of claim 3, wherein said pressurized fluid is water.

7. The apparatus of claim 5, wherein said pressurized fluid is water.

8. The apparatus of claim 7, further comprising means for transmitting signals indicating the presence or absence of said escaped test gas from said test chamber to a control panel.

9. An apparatus for forming a test chamber within tubulars and internally pressure testing said tubulars with a test gas comprising:
    (a) a generally cylindrical tester body having first and second spaced-apart sealing assemblies, each of said sealing assemblies having a plurality of resilient seals, said seals of said seal assemblies being sealably expandable against the inner wall of said tubular so as to form a test chamber defined by the inner wall of said tubular and said expanded seal assemblies;
    (b) a first piston assembly acting in cooperation with said seals of said first sealing assembly, said first piston assembly having a plurality of first pistons moving axially from said tester body in response to pressurized gas so as to seal said plurality of resilient seals of said first sealing assembly against the inner wall of said tubular;
    (c) a second piston assembly acting in cooperation with said seals of said second sealing assembly, said second piston assembly having a plurality of second pistons moving axially from said tester body in response to pressurized fluid so as to seal said plurality of resilient seals of said second sealing assembly against the inner wall of said tubular;
    (d) means for providing and controlling said gas pressure independent from said fluid pressure;
    (e) means for directing said pressurized gas to said test chamber;
    (f) gas retaining means for retaining said pressurized gas that has escaped from said test chamber to the exterior of said tubular;
    (g) gas detecting means for detecting the presence of test gas in said gas retaining means; and
    (h) means for generating and transmitting signals from said gas detecting means to a control panel to indicate and record the presence of said gas in said gas retaining means.

10. The apparatus of claim 9, wherein said pressurized gas is helium.

11. The apparatus of claim 10, wherein said retaining means for retaining test gas that has escaped from said test chamber to the exterior of said tubular is a tubular containment sleeve wrapped around the outside of said tubular.

12. The apparatus of claim 11, wherein said means for providing and controlling said gas pressure independent from said fluid pressure includes a gas pressure source and gas pump and a fluid pressure source and fluid pump.

13. The apparatus of claim 12, wherein said pressurized fluid is water.

14. The apparatus of claim 13, wherein said gas detecting means is a helium detector.

15. An apparatus for forming a test chamber within tubulars and internally pressure testing said tubulars with a test gas comprising:

(a) a generally cylindrical tester body having first and second spaced-apart sealing assemblies, each of said sealing assemblies having a plurality of resilient seals, said seals of said seal assemblies being sealably expandable against the inner wall of said tubular by a piston assembly so as to form a test chamber defined by the inner wall of said tubular and said expanded seal assemblies;

(b) a plurality of gas actuated pistons acting in cooperation with said seals of said first sealing assembly by moving axially from said tester body in response to a gas under pressure so as to seal said plurality of resilient seals of said first sealing assembly against the inner wall of said tubular;

(c) a plurality of fluid actuated pistons acting in cooperation with said seals of said second sealing assembly by moving axially from said tester body in response to a fluid under pressure so as to seal said plurality of resilient seals of said second sealing assembly against the inner wall of said tubular;

(d) means for providing a gas under pressure through said tubular body to said gas actuated piston for moving said gas actuated piston;

(e) means for providing a fluid under pressure through said tubular body to said fluid actuated piston for moving said fluid actuated piston;

(f) means for controlling the pressure of said gas under pressure;

(g) independent means for controlling the pressure of said fluid under pressure;

(h) means for directing said gas under pressure to said test chamber to serve as a test gas;

(i) gas retaining means for retaining said test gas escaping from said test chamber to the exterior of said tubular;

(j) gas detecting means for detecting the presence of test gas in said gas retaining means; and (k) means for generating and transmitting signals from said gas detecting means to a control panel to indicate and record the presence of said gas in said gas retaining means.

16. The apparatus of claim 15, wherein said gas under pressure is helium.

17. The apparatus of claim 16, wherein said retaining means for retaining test gas that has escaped from said test chamber to the exterior of said tubular is a tubular containment sleeve wrapped around the outside of said tubular.

18. The apparatus of claim 17, wherein the fluid under pressure is water.

19. An apparatus for forming a test chamber within tubulars and for internally pressure testing said tubulars with a test gas comprising:

(a) a generally cylindrical tester body having a first sealing assembly and a second sealing assembly, said first sealing assembly and said second sealing assembly being spacedapart from each other, said first sealing assembly and said second sealing assembly each having a plurality of resilient seals, each of said resilient seals being expandable against the inner wall of said tubular;

(b) a first means for expanding and releasing said resilient seals of said first sealing assembly;

(c) a second means for expanding and releasing said resilient seals of said second sealing assembly, said first means for expanding and releasing said resilient seals of said first sealing assembly being independent from said second means for expanding and releasing said resilient seals of said second sealing assembly so as to allow the expanding and the releasing of said seals of said first sealing assembly and the expanding and the releasing of said seals of said second sealing assembly in a desired sequence so as to create, as desired, a test chamber defined by the inner wall of said tubular, said resilient seals of said first sealing assembly and said resilient seals of said second sealing assembly when said resilient seals of said first sealing assembly and said resilient seals of said second sealing assembly are expanded against the inner wall of said tubular;

(d) means for supplying a pressurized test gas to said test chamber;

(e) retaining means for retaining test gas that has escaped from said test chamber to the exterior of said tubular; and (f) means for detecting the presence of test gas in said retaining means.

20. The apparatus of claim 19, wherein said first means for expanding and releasing said seals of said first sealing assembly is a first piston assembly, said first piston assembly having a plurality of first pistons, said first pistons moving axially from said tester body in response to pressurized gas so as to seal said plurality of resilient seals of said first sealing assembly against the inner wall of said tubular when said gas pressure is applied to said first pistons and said second means for expanding and releasing said seals of said second sealing assembly is a second piston assembly, said second piston assembly having a plurality of second pistons moving axially from said tester body in response to pressurized fluid so as to seal said plurality of resilient seals of said second sealing assembly against the inner wall of said tubular when said fluid pressure is applied.

21. The apparatus of claim 20, wherein said pressurized gas for moving said first pistons of said first piston assembly is said test gas.

22. The apparatus of claim 21, wherein said retaining means for retaining test gas that has escaped from said test chamber to the exterior of said tubular is a tubular containment sleeve wrapped around the outside of said tubular.

23. The apparatus of claim 22, wherein said test gas supply means comprises a conduit running centrally through said tester body for moving said first pistons of said first piston assembly and for supplying said test gas to said test chamber.

24. The apparatus of claim 23, further comprising means for transmitting signals indicating the presence or absence of said escaped test gas from said test chamber to a control panel.

25. A method for internally pressure testing tubulars with a test gas comprising:

(a) providing a testing apparatus having a generally cylindrical body, a first sealing assembly having a plurality of resilient seals and a second sealing assembly having a plurality of resilient seals, said first sealing assembly and said second sealing assembly being spaced apart from each other along said cylindrical body, said seals of first sealing assembly and said seals of said second sealing assembly being sealably expandable against the inner wall of said tubular so as to form a test chamber defined by said inner wall of said tubular and when said seals of said first sealing assembly and said seals of said second sealing assembly are expanded against said inner wall of said tubular;

(b) providing means for expanding and releasing said seals of said first sealing assembly and means for expanding and releasing said seals of said second sealing assembly in a desired sequence, independent of each other;

(c) placing said testing apparatus at a desired location within said tubular;

(d) directing pressurized test gas to said test chamber formed within said tubular;

(e) providing a gas retaining sleeve on the exterior of said tubular at a desired location;

(f) retaining said test gas escaping from said test chamber to the exterior of said tubular in said gas retaining sleeve;

(g) detecting the presence of said test gas in said gas retaining sleeve with a gas detecting means; and (h) generating and transmitting signals from said gas detecting means to a control panel to indicate and record the presence of said test gas in said gas retaining sleeve.

26. The method as recited in claim 25, wherein said step of providing means for expanding and releasing said seals of said first sealing assembly and said seals of said second sealing assembly in a desired sequence, independent of each other, includes the step of providing a first piston assembly acting in cooperation with said seals of said first sealing assembly moving axially from said tester body in response to pressurized gas so as to seal said plurality of resilient seals of said first sealing assembly against the inner wall of said tubular and the step of providing a second piston assembly acting in cooperation with said seals of said second sealing assembly moving axially from said tester body in response to pressurized fluid so as to seal said plurality of resilient seals of said second sealing assembly against the inner wall of said tubular.

27. The method as recited in claim 26 further comprising the step of providing a gas source and gas pump to maintain a desired flow of pressurized gas to said first piston assembly and a fluid source and fluid pump to maintain a desired flow of pressurized fluid to said second piston assembly.

28. The method as recited in claim 27 wherein said pressurized gas is said test gas.

29. The method as recited in claim 28 wherein said test gas is helium.

30. The method as recited in claim 29 wherein said pressurized fluid is water.

31. The method as recited in claim 30 where the step of detecting the presence of test gas in said gas retaining sleeve with a gas detecting means includes providing a helium detector as said gas detecting means.

* * * * *